S. DUFALA.
END GATE FOR WAGONS AND VEHICLES.
APPLICATION FILED FEB. 26, 1914.
1,125,982.
Patented Jan. 26, 1915.
2 SHEETS—SHEET 1.
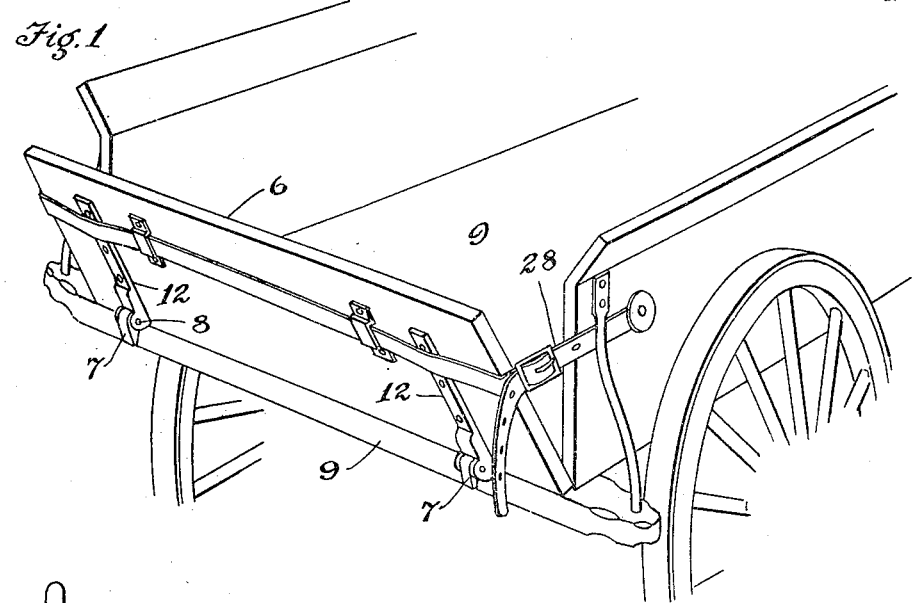
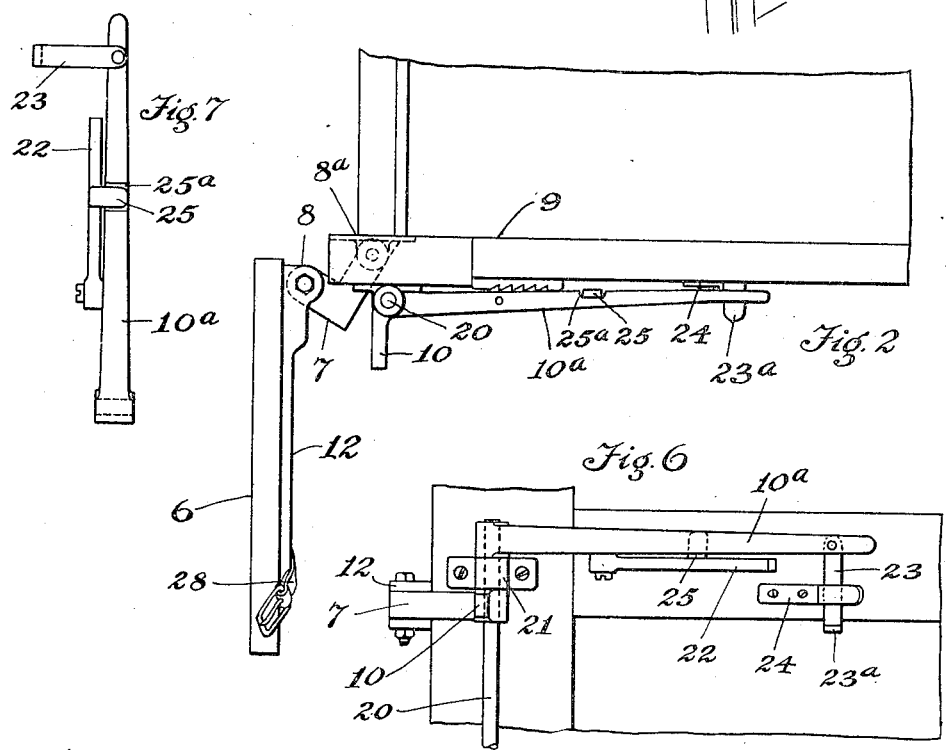
Witnesses:
F. C. Valentine
S. J. Bommhardt
Inventor:
Stefan Dufala
by John A. Bommhardt
Attorney.

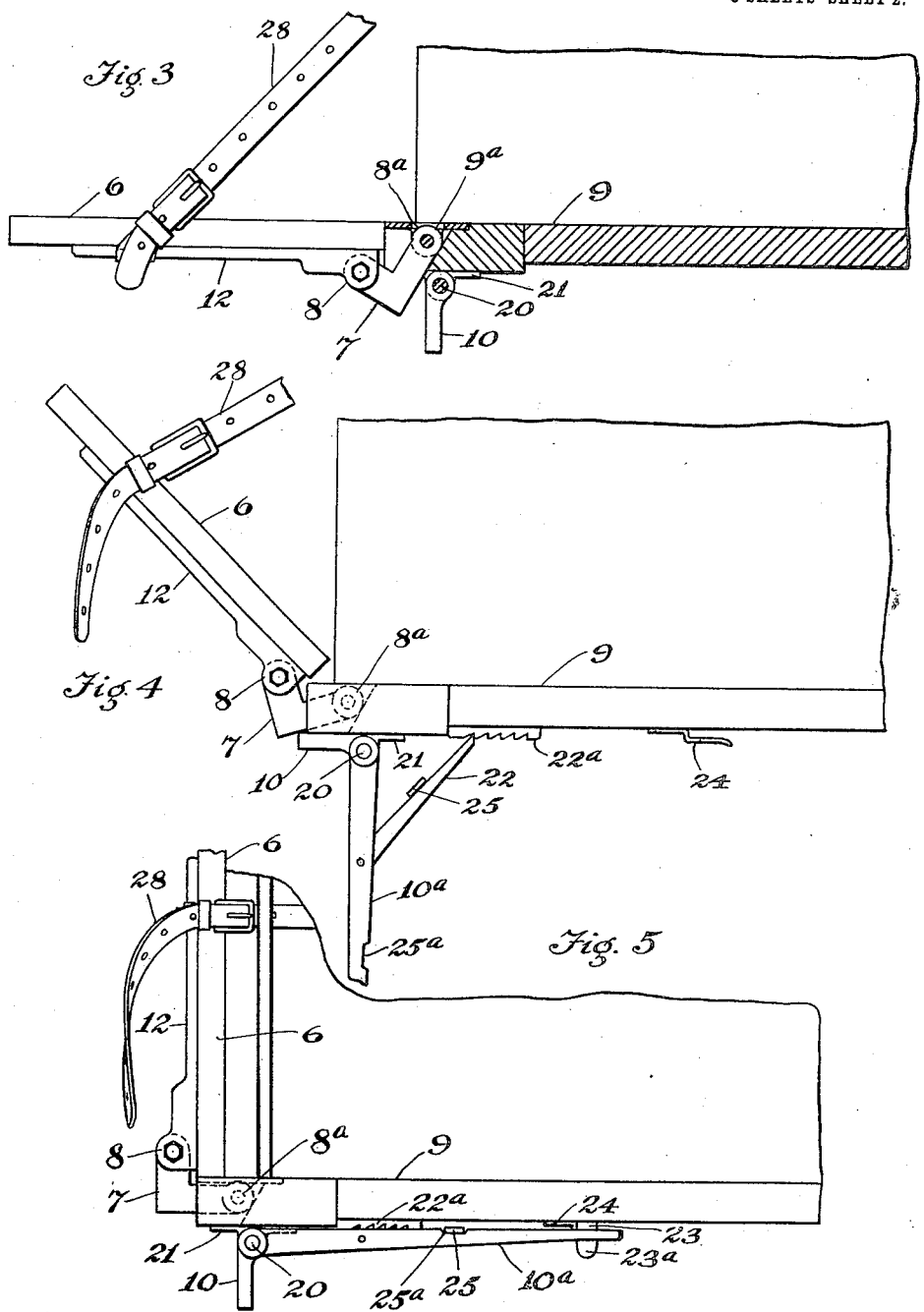

UNITED STATES PATENT OFFICE.

STEFAN DUFALA, OF CLEVELAND, OHIO.

END-GATE FOR WAGONS AND VEHICLES.

1,125,982.   Specification of Letters Patent.   Patented Jan. 26, 1915.

Application filed February 26, 1914. Serial No. 821,189.

*To all whom it may concern:*

Be it known that I, STEFAN DUFALA, a subject of Emperor Franz Josef of Austria-Hungary, residing at Cleveland, in the county of Cuyahoga and State of Ohio, have invented certain new and useful Improvements in End-Gates for Wagons and Vehicles, of which the following is a specification.

This invention relates to end gates for wagons and other vehicles, and has for its object to provide an end gate attached to the vehicle by an improved form of hinge, whereby the gate will fit within and rest upon the bed or bottom of the wagon when it is closed, and will drop down flush with the bottom or in a hanging position when it is opened, the hinge having two joints permitting the movement necessary to swing the gate to the positions indicated.

A further object of the invention is to provide improved means for lifting the gate to closed position.

In the accompanying drawings:—Figure 1 is a perspective view of an end gate provided with hinges of the type referred to. Fig. 2 is a side elevation showing the gate in open position, the gate hanging down. Fig. 3 is a sectional view with the gate in open position, flush with the wagon bottom. Fig. 4 is a side elevation showing the gate partly closed. Fig. 5 is a similar view showing the gate in closed position. Fig. 6 is a detail plan view of lever handle device on underside of wagon bottom. Fig. 7 is another detail view of lever handle.

Referring specifically to the drawings, 6 indicates the gate connected to the wagon bed by a plurality of hinges. Each hinge consists of a strap member 12 fixed to the outside of the gate and a swinging angular knuckle member 7 pivoted at one end to the strap member 12 at 8, and at the other end to the bottom 9 of the wagon bed, as indicated at 8ª, the end of the knuckle 7 fitting within a slot 9ª in the wagon bottom. The knuckle member 7 is bent or angular as shown, and is of such length that it permits the gate to be swung up over the edge or corner of the bottom 9 and into closed position resting on the top or upper surface of said bottom, as shown in Fig. 5, and when swung down it may be held in flush position with respect to the bottom of the wagon body, by an ordinary adjustable strap or chain 28 as shown in Fig. 3—or it may be dropped down in a hanging position as shown in Fig. 2.

To provide for lifting the gate, especially when a heavy gate is used, I provide levers 10 projecting from a crank shaft 20 extending lengthwise through hangers 21 attached to the underside of the wagon bottom, and this crank shaft is provided with a lever handle 10ª at one end thereof, by means of which it may be turned. The levers 10 are in proper position to engage under the knuckle members 7 of the hinges, as shown in Figs. 2, 4 and 5, and when the gate is to be closed the lever handle may be moved in the proper direction, and the upward pressure of the levers 10 on the hinge members 7 will swing the same up as indicated in Figs. 4 and 5 until the end gate is raised to such position that it may be swung over into the wagon bed and upon the bottom thereof as indicated in Fig. 5. A pawl 22 pivoted to lever handle 10ª as shown in Figs. 4 and 5 is provided to operate on teeth 22ª secured to the underside of the wagon bottom to hold the gate in partly closed position as shown in Fig. 4.

A stop 25 is provided on said pawl 22 and engages recess 25ª on lever handle 10ª when lever handle device is not in use as indicated in Figs. 2 and 5. This keeps the pawl from swinging down when handle is in locked position. Further, a catch 23 is pivoted to the free end of the lever handle 10ª, and extends laterally as shown at 23ᴬ and is used to lock the lever handle by engaging under the spring catch 24 attached to the underside of the wagon bottom when the lever handle is not in use as shown in Fig. 6. The lever handle device for closing the gate may be omitted when light gates are used.

It will be seen that no part of the hinge, when the gate is either open or closed, is exposed to contact with articles being loaded or unloaded. This prevents breakage of the hinges incident to contact therewith of heavy articles. The hinges are protected from injury under all conditions.

What I claim as new is:

1. The combination with a vehicle bottom and end gate, of a hinge comprising a leaf attached to the gate, and a link pivoted at one end to said leaf and at the other end to said bottom below the top surface thereof, said link being angular so that the gate when closed will seat upon the top surface of said bottom.

2. The combination with a vehicle bottom and end gate hinged at its inner edge thereto, of a lever fulcrumed on the bottom and bearing against the gate to lift and close the same.

3. The combination with a vehicle bottom and end gate hinged thereto, of a crank mounted on the underside of the bottom and having an arm projecting under the gate to lift and close the same when the crank is turned.

4. The combination with a vehicle bottom and end gate, of a double jointed hinge, having an intermediate link member, connecting the bottom and the gate, and a lever fulcrumed on the bottom and bearing against the underside of said link member to lift the gate.

In testimony whereof, I do affix my signature in presence of two witnesses.

STEFAN DUFALA.

Witnesses:
JOHN F. QUINT,
JOHN A. BOMMHARDT.

Copies of this patent may be obtained for five cents each, by addressing the "Commissioner of Patents, Washington, D. C."